United States Patent [19]

Walters et al.

[11] Patent Number: 5,217,768

[45] Date of Patent: Jun. 8, 1993

[54] ADHESIVELESS SUSCEPTOR FILMS AND PACKAGING STRUCTURES

[75] Inventors: Glenn J. Walters; Gordon E. Walters, both of Duxbury, Mass.

[73] Assignee: Advanced Dielectric Technologies, Boston, Mass.

[21] Appl. No.: 755,157

[22] Filed: Sep. 5, 1991

[51] Int. Cl.⁵ ............................................. B32B 3/00
[52] U.S. Cl. .................................... 428/35.8; 428/461;
428/34.3; 428/107; 428/209; 428/323;
428/35.7; 426/107; 426/126; 426/234; 426/243;
426/113; 219/10.55
[58] Field of Search .............. 426/107; 428/35.08,
428/461, 107, 323

[56] References Cited

U.S. PATENT DOCUMENTS

| | | | |
|---|---|---|---|
| 4,322,003 | 3/1982 | Long | 206/525 |
| 4,911,938 | 3/1990 | Fisher et al. | 426/107 |
| 4,911,960 | 3/1990 | Mudge et al. | 428/34.3 |
| 4,925,685 | 5/1990 | Sahi | 426/123 |
| 4,933,193 | 6/1990 | Fisher | 426/107 |
| 4,946,743 | 8/1990 | Winter | 428/249 |
| 4,962,000 | 10/1991 | Emslander et al. | 426/107 |
| 4,963,424 | 10/1990 | Beckett | 428/209 |
| 4,966,765 | 10/1990 | Genske et al. | 428/35.03 |
| 4,972,058 | 11/1990 | Benson et al. | 219/10.55 |
| 4,985,300 | 1/1991 | Huang | 428/332 |
| 5,006,405 | 4/1991 | Watkins et al. | 428/323 |
| 5,059,436 | 10/1991 | Clark | 426/107 |
| 5,081,330 | 1/1992 | Brandberg et al. | 426/107 |

Primary Examiner—Patrick J. Ryan
Assistant Examiner—Abraham Bahta
Attorney, Agent, or Firm—Wolf, Greenfield & Sacks

[57] ABSTRACT

A susceptor composite and related packaging devices employing the susceptor composite comprising a plurality of heat sealable layers is disclosed. The susceptor composite is adhesiveless and is used in food packages for heating and cooking food products in a microwave oven. In one preferred embodiment, a first substrate of amorphous polyester has a metallic microwave absorptive layer deposited on one of its surfaces. A dimensionally stable layer that includes a heat sealable material is heat sealed to at least one of the first substrate and microwave absorptive layer. The heat sealable film can be applied in a pattern and can also be applied using different heat-sealing temperatures to provide selective microwave absorption to the susceptor composite of the invention.

14 Claims, 3 Drawing Sheets

ADHESIVELESS SUSCEPTOR FILMS AND PACKAGING STRUCTURES

FIELD OF THE INVENTION

The present invention relates to microwave susceptors for use in packaging of microwaveable food products wherein the susceptor includes one or more heat-sealable layers.

BACKGROUND OF THE INVENTION

Microwaveable bags or packages, particularly those adapted for the microwave cooking or browning of food products, are generally made from a composite that includes several layers of flexible, microwave-transparent sheet material. In general, the outer layer of such a package is paper or cardboard and the inner layer is a liner of polymer film to which can be applied a microwave absorptive layer such as a thin metallic layer to form a metallized film. The film is adapted to conduct thermal energy as heat upon interaction with incident microwave energy to provide a means for browning or crispinq the food product contained within the package. Such microwave absorptive materials are typically referred to as "susceptors".

In order to properly brown or crisp foods, it is desirable to have a susceptor packaging material which supplies enough heat energy to the surface of the food so that the surface can be properly browned or crisped in a time that is sufficiently short so as to prevent the interior of the food from becoming overcooked.

Typically, susceptor containing microwave packaging is formed of a number of sheets of material or plies which are joined together into a composite using an adhesive. The adhesive typically is subjected to temperatures on the order of about 400° F. to about 500° F. during .microwave cooking. Currently, laminating adhesives for use in microwaveable susceptors and packaging products are water-based adhesives designed to replace prior art adhesive polymers such as blends of ethylene vinyl acetate emulsion, vinyl acetate emulsion and a soft ethylene vinyl acetate acrylic latex. See for example U.S. Pat. No. 4,911,960 (Mudqe et. al.), and references cited therein. These prior art adhesive compositions suffer from several disadvantages.

In packaging materials containing adhesives, the adhesive bond between the plies can fail at elevated temperatures, thereby weakening the package and often causing a rupture during use in the microwave oven. Also, during the food cooking process, the adhesive material may volatilize, subjecting the food to solvents and other chemicals which can both compromise the flavor of the food and possibly deposit toxic substances thereon. Further, the polymer film often cracks, thus allowing volatiles to reach the food. There is also an additional processing cost associated with these adhesives and the added cost of lamination.

SUMMARY OF THE INVENTION

The present invention provides a susceptor film for incorporation into food packaging that eliminates the need for adhesives and that provides a high degree of heating to the surface of the food. The amount of such heat can be adjusted by providing a heat-sealable composite that is selectively absorptive to microwave radiation.

The objects of this invention can be achieved by providing a packaging material used in the packaging and microwave cooking of food that includes a susceptor having opposed first and second surfaces formed from a first substrate of a heat-sealable polymer that is amorphous (i.e. non crystalline) and transparent to microwaves. A microwave absorbing material is deposited on at least one opposed surface of the first substrate in an amount sufficient to cause the susceptor film to heat under microwave cooking conditions to a temperature suitable for browning or crispinq of food items placed adjacent to the susceptor. The susceptor further comprises a dimensionally stable second substrate that may include a heat sealable polymeric material In one embodiment of the invention, this dimensionally stable second substrate is heat sealed to the microwave absorptive layer. In another embodiment, the second substrate is heat sealed to a surface of the first substrate opposite the microwave absorptive layer. The first substrate and microwave absorptive layer can also be heat sealed between two separate layers of dimensionally stable, heat-sealable second substrate.

In yet another embodiment, the heat sealable second substrate is sealed to only a portion of the microwave absorptive layer or heat-sealable first substrate so that an air gap is formed between the portions of the second substrate and the portions of the immediately adjacent material that are not heat sealed to one another. This air gap may act as a potential heat insulator, particularly if the dimensionally stable second substrate is a paper or paperboard product forming an outside surface of the microwave package.

The invention also pertains to a composite that is formed into the shape of a package or bag sufficient to enclose a food product that is to be cooked within the package under microwave conditions. The composite comprises a flexible first substrate having opposed surfaces, which first substrate is a heat-sealable polymeric material that is preferably an amorphous polyester substantially transparent to microwaves. The flexible first substrate has a microwave absorptive layer deposited on a first surface thereof, this microwave absorptive layer covering a surface area sufficient to heat the composite when microwaves contact the microwave absorptive layer. The composite also comprises a dimensionally stable second substrate that includes a heat-sealable polymeric material, which can be the same polymeric material that comprises the first substrate. This dimensionally stable second substrate is heat sealed to a surface of the flexible first substrate.

In another embodiment of the composite packaging, the flexible first substrate containing the microwave absorptive layer is heat sealed between two layers of a dimensionally stable second substrate. In a further embodiment, the composite includes a dimensionally stable second substrate that is heat-sealed to only a portion of either the first substrate and/or the microwave absorptive layer, thus defining an air gap between a non heat sealed portion of the second substrate and a non heat sealed portion of at least one of the microwave absorptive layer and first substrate.

Using appropriate heat-sealable materials, heat-sealing can be performed in a defined pattern and under specified conditions to create a composite susceptor film that eliminates the need for adhesives and selectively absorbs microwave energy to a greater or lesser amount. This invention therefore also provides a selectively absorptive susceptor composite in which the portions of the composite that are heat-sealed are heat-sealed at different temperatures, pressures and patterns. This differential heat-sealing will cause differential distortion of the electrical resistance of the microwave absorptive layer and provides a method of creating a selectively absorptive susceptor. This invention also provides a susceptor composite in which those portions of the composite that are heat sealed in the form of a regular, geometric pattern. The dimensions of the pattern enable the susceptor to be selectively absorptive to microwave energy so that a greater or lesser amount of the microwave energy will be absorbed by the susceptor.

Therefore, one object of this invention is to provide a susceptor film and packaging structure in the form of a composite that does not require adhesives to bond the separate layers;

Another object of the invention is to provide an adhesiveless susceptor film in which the various components of the film are heated sealed together;

It is yet another object of the invention to provide a selectively absorptive susceptor film, in which the susceptor is made selectively absorptive to microwaves by heat sealing the susceptor film in a defined pattern;

It is a further object of the present invention to provide an adhesiveless composite for microwave packaging that insulates the outer layer of the packaging;

It is a further object of the present invention to provide an adhesiveless susceptor film and packaging structure that is cost effective to produce and eliminates intermediate steps in the production process.

DETAILED DESCRIPTION OF THE INVENTION

This invention pertains to adhesiveless microwave susceptor composites in which adjacent layers are heat sealed to each other. The term "composite" refers to a structure that includes a plurality of overlapping, planar members or sheets.

Typical prior art susceptors are made by depositing a thin film of microwave absorptive material, usually a metal, upon a polymeric substrate using any number of known deposition techniques. Substrates are laminated together with adhesive. When exposed to microwave radiation, the microwave absorptive coating of the susceptor will absorb the radiation and rapidly become relatively hot.

Figure 1:
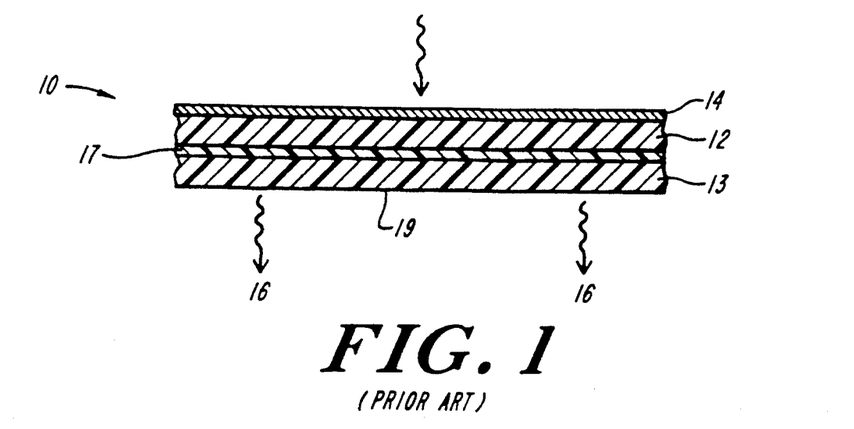
FIG. 1 shows a prior art susceptor including a microwave absorptive layer deposited on a first substrate, which first substrate is glued to a dimensionally stable second substrate.

Prior art susceptors are illustrated schematically in FIG. 1 which shows a film 10, including a substrate zone 12,13 and a metallic coating zone 14. As used herein and throughout the specification, the term "zone" means a region or area distinct from an adjacent area by a sharp boundary or by a gradual change. The substrate zone 12, 13 can include one or more layers and the layers are bonded together using an adhesive 17. A microwave source (not shown) produces microwave energy 16 that impinges upon coating zone 14. Typically, the microwave energy field 16 is produced by a magnetron of a microwave oven. The coating zone 14 is designed to absorb a substantial portion of the incoming microwave energy 16 and is converted into conductive thermal energy sufficient to heat, cook, or crisp the food directly as heat transferred across interface 19 of the substrate zone.

Figure 2:
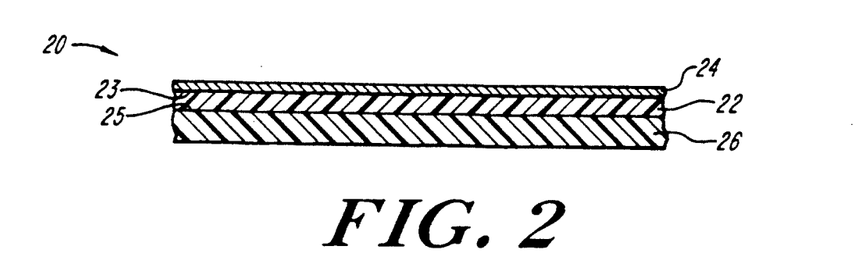
FIG. 2 shows a susceptor composite of the present invention.

Referring to FIG. 2, an adhesiveless susceptor composite 20 of the present invention is depicted which comprises a first substrate 22 having opposed first and second surfaces 23, 25, upon one surface of which is deposited a means 24 for receiving microwave energy. This means is referred to herein as a "microwave absorptive layer" and is typically a film or coating of metal, described in more detail below. Thickness of the microwave absorptive layer is chosen to create the necessary heat required for thermally conductive browning and crisping of food.

Susceptor composites can be created which are selectively absorptive to microwave energy. The term "selectively absorptive" as used herein refers to a susceptor that has the ability to control the amount of microwave radiation absorbed, and control the microwave radiation transferred through the susceptor.

A significant feature of the present invention is that first substrate 22 can be heat-sealed to a second substrate 26. The term "heat-seal" is meant to include the process in which materials that tend to become plastic under the application of heat will seal to each other when they are exposed to heat and slight pressure. Thus, a seal can be made by heating the material above a certain temperature, and applying a suitable force to hold the surfaces to be sealed, until a seal is formed. A number of heat sealable crystalline thermoplastic materials are known, including ethylene polymers and copolymers. Heat resistance of polyethylene is, however, limited to temperatures below about 180° F. Crystalline polyesters will decompose rapidly when exposed to microwave energy so that crystalline polyester materials require strong adhesives to form laminate structures.

Particularly preferred materials used to form first substrate 22 in the present invention are amorphous (i.e.

randomly ordered chain structure or noncrystalline) polyesters. These polyesters have preferred properties shown in Table I.

TABLE I

| Property | Value (Range of Values) | |
| --- | --- | --- |
| Density (g/cc) | 1.26 | |
| Melt Point (°C.) | 265 | |
| Tensile Strength (MPa)[a] | | (37–49) |
| Yield Strength (MPa)[a] | | (26–29) |
| Elongation (%) | | (300–500) |
| Secant Modulus (MPa) | 1430 | |
| Elmendorf Tear (g/mm)[b] | | (1140–1470) |
| Oxyen Transmission[c] (cc-mil/100 in$^2$-day-atm) | 18.8 | |
| Water Vapor Transmission[d] (gm-mil/110 in$^2$-day-atm) | 2.6 | |

[a] ASTM D882
[b] ASTM D1922
[c] ASTM D3985
[d] ASTM E96

Although amorphous polyester materials are preferred, thermoplastics that maintain their integrity under high temperature microwave conditions can be coated with a layer of heat-sealable material. The resulting laminated thermoplastic can have the same functional property of heat-sealability as the preferred amorphous polyesters.

A further significant feature of the present invention is that the first substrate 22, while heat sealable, is not heat releasable under the temperature conditions encountered in microwave ovens. The term "heat releasable" refers to a material which melts or loses its heat sealing strength at temperatures above its heat-sealing temperature. While not wishing to be bound by any particular theory, it is believed that the preferred heat-sealable materials of the present invention are not heat-releasable because of the manner in which they are heat-sealed. Temperature, heat sealing pressure, and dwell time (i.e. time over which the pressure is applied) can all be varied during heat-sealing so that microwave oven temperature alone is not the primary factor in determining strength of the heat seal. In particular, portions of the heat sealed materials may be subjected to elevated pressures during sealing because of minute irregularities on the surface of the heat applicator. This may result in adjacent heat-sealed layers being molecularly bonded together by polymer polymer interactions, making delamination at elevated temperatures very difficult. Furthermore, it is also believed that heat sealed materials of the invention do not undergo as great a microwave induced temperature increase as non heat-sealed portions. As explained in more detail below, the electrical resistivity of heat sealed materials described herein is altered when compared to non heat-sealed materials. This change in electrical resistivity may result in the heat sealable materials undergoing little heating when exposed to microwaves so that the materials do not get hot enough to be easily heat-releasable. It is well within the ordinary skill of those in the art to determine the extent to which various materials are heat-releasable by varying heat-sealing parameters and determining the temperature at which the heat seal loses its strength.

In one embodiment, the first substrate is an amorphous polyester sheet having a thickness of about 0.2 mil to about 2 mil. A thickness of about 78 (0.78 mil) to about 92 gauge (0.92 mil) is preferred. Exemplary first substrates contain polyester resins that are commercially available under the tradename SELAR® P-900 (DuPont Chemical Corporation, Wilmington, DE) and are manufactured by Turex, Inc. (Harrisville, RI 02830).

Applicants have discovered that the net resistance of the microwave absorptive layer 24 to microwave radiation is changed but not completely eliminated by distorting the microwave absorptive layer at the heat-seal locations. Depending upon the initial resistivity of the absorptive layer, when heat sealing is performed at a relatively low heat-seal temperature, the net heating effect of the susceptor when placed in a microwave field generally will be higher than if the same sealing is accomplished with a higher heat-seal temperature. A preferred heat-sealing temperature range includes temperatures between about 200 degrees Farenheit ("low" seal temperature) to about 375 degrees Farenheit ("hiqh" seal temperature). Moreover, the pressure at which the heat sealing occurs will also influence the distortion of the microwave absorptive layer. Pressures between about 5 psi to about 50 psi can be used, although at about 50 psi the integrity of the microwave absorptive layer and the first substrate may be compromised. A particularly preferred pressure is that pressure which does not weaken the structural and functional characteristics of the susceptor film at a specific temperature.

Referring again to FIG. 2, the microwave absorptive layer 24 is preferably a microwave absorbing coating that is applied by any deposition process, provided that the deposition process will not damage the first substrate 22. In one embodiment, a vapor deposition process is used, which process can be any one in which materials are deposited upon substrates from the vapor phase. Deposition methods such as chemical and physical vapor deposition (CVD, PVD) which include sputtering, ion plating, electroplating, electron beam and resistive or inductive heating are intended to be included herein. Methods for providing the microwave absorptive material are not intended to be limiting as such. Rather, any method for applying microwave absorptive material as a thin film can be used.

The microwave absorptive layer 24 may interact with the electric and magnetic components of the microwave energy field. A portion of the microwave energy directed upon the microwave absorptive layer is reflected, a portion absorbed, and a portion transmitted into the first substrate 22, the absorbed energy being converted into thermal energy. Equations for calculating the relative proportions of the reflected, absorbed, and transmitted energy are given in the literature. See, for example, R. L. Ramey et. al., "Properties of Thin Metal Films at Microwave Frequencies", *J. Appl. Phys.*, Vol. 39(3), (1968).

It can be calculated that, for maximum absorbance of impinging microwaves, the resistivity of the microwave absorptive layer must be about one half the resistivity of the medium through which the microwave energy passes (i.e. in most cases, free space). Theoretically, for optimum absorption, the resistivity of the microwave absorptive layer should be about 188 ohms per square; one half the resistivity of free space.

The microwave absorptive layer 24 has a resistivity in the range of about 10 to about 1000 ohms per square. A variety of electrically conductive materials can be used to form the microwave absorptive layer 24. This layer can comprise a coating of a single metal, a metal alloy, a metal oxide, a mixture of metal oxides, a dispersion of conductive metallic or non-metallic materials in a binder, or any combination of the foregoing. Suitable exemplary metals include aluminum, iron, tin, tungsten, nickel, stainless steel, titanium, magnesium, copper and chromium. For aluminum, a preferred resistivity range is from about 50 to about 150 ohms per square. Suitable exemplary metal oxides include oxides of aluminum, iron and tin. However, if not electrically conductive, (for example, aluminum oxide), they must be used in combination with an electrically conductive material. Suitable exemplary dispersion materials include carbon black, metallic inks, graphite, powdered metals and metal whiskers.

A dimensionally stable second substrate 26 is heat-sealed to either or both of the first substrate 22 or the microwave absorptive layer 24. In the embodiment shown in FIG. 2, the second substrate 26 is heat-sealed to the first substrate 22 on a surface opposite the microwave absorptive layer 24. Second substrate 26 is "dimensionally stable", which term is meant to include paper, paperboard, cardboard, and clay coated paper and board materials that can maintain their packaging structural integrity and may be self-supporting. Preferably, dimensionally stable second substrate 26 also includes a heat sealable polymeric material. This heat sealable polymeric material may be identical to the amorphous heat sealable polymeric material of the first substrate 22.

Figure 3:
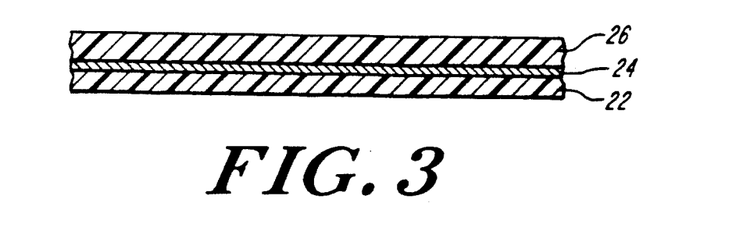
FIG. 3 shows another embodiment of the susceptor composite of the present invention.
Figure 4:
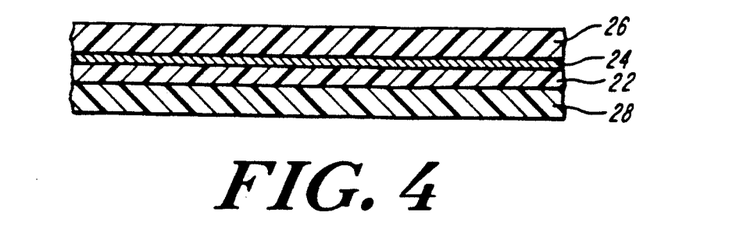
FIG. 4 shows a third embodiment of the susceptor composite of the present invention.

FIG. 3 shows another embodiment of the invention in which the dimensionally stable second substrate 26 is heat sealed directly to the microwave absorptive layer 24. Similarly, FIG. 4 shows yet another embodiment in which the first substrate 22 and microwave absorptive layer 24 are sandwiched between two heat sealed dimensionally stable second substrates 26, 28. As described in more detail below, these embodiments of FIGS. 2-4 can be used most effectively as composites in packaging material for use in microwave cooking of food. In particular, the embodiment shown in FIGS. 3 and 4 are effective in microwave packaging of foods since the microwave absorptive layer 24 can be kept away from direct contact with the food product.

The embodiments thus far described in FIGS. 2-4 include adhesiveless susceptor films in which the respective layers are heat sealed completely to one another over substantially the entire surface area of the layers. In other embodiments of the invention, the respective materials are heat sealed at only a portion of their respective surface areas so that a gap is formed between a non heat-sealed portion of one layer and the non heat sealed portion of the immediately adjacent layer.

Figure 5:
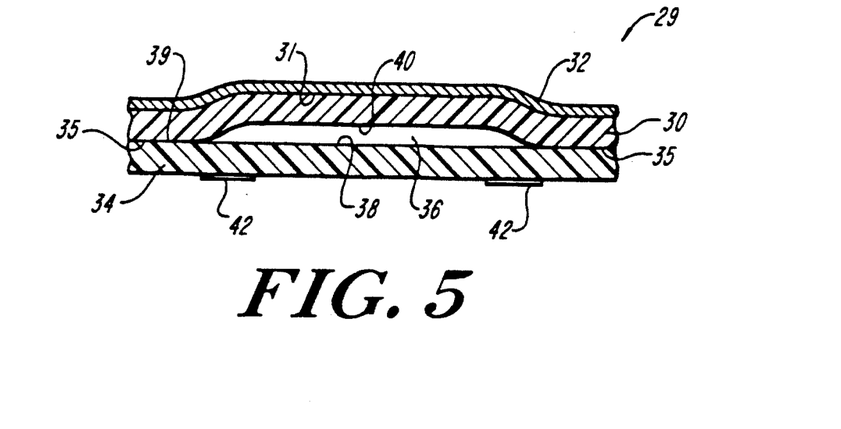
FIG. 5 shows a susceptor composite of the present invention in which the dimensionally stable second substrate is heat sealed to the perimeter of the first substrate.

Referring now to FIG. 5, a susceptor film 29 is illustrated which includes a first substrate 30 having opposed first and second surfaces 31, 39, onto one surface of which is deposited a microwave absorptive layer 32. A dimensionally stable second substrate 34 is heat sealed to an outer periphery 35 of the first substrate 30 on a surface of the first substrate opposite to the surface containing microwave absorptive layer 32. By heat-sealing the dimensionally stable second substrate to the outer periphery 35 of the first substrate 30, an air gap 36 is formed between a non heat-sealed surface 38 of the second substrate and an adjacent, non heat-sealed surface 40 of the first substrate. It will be appreciated that FIG. 5 is not drawn to scale and that the actual width of the air gap 36 without the weight of a food product is on the order of about 1/32" to about θ (0.8 to 6.3 mm). It will be appreciated that air gap 36 can be made substantially larger. Air gap 36 can provide an insulative layer to protect the second substrate 34 from overheating during microwave cooking of foods. In particular, if the second substrate 34 is used as an outer layer of a microwaveable package, which layer would contain lettering or other ink-based deposits 42, the air gap 36 can reduce overheating of this outer, second substrate layer and deformation of the lettering and/or volatilization of the ink.

Figure 6:
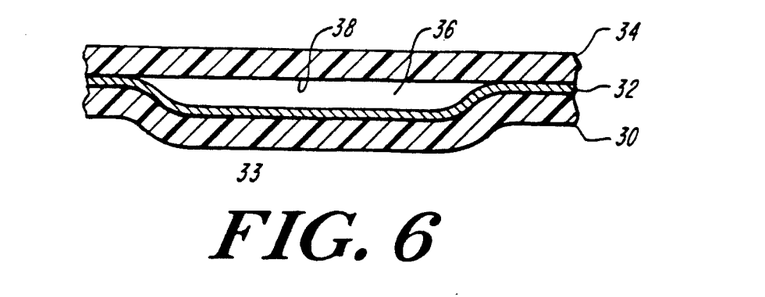
FIG. 6 shows an embodiment of the invention in which the dimensionally stable second substrate is heat sealed to the perimeter of the microwave absorptive layer.
Figure 7:
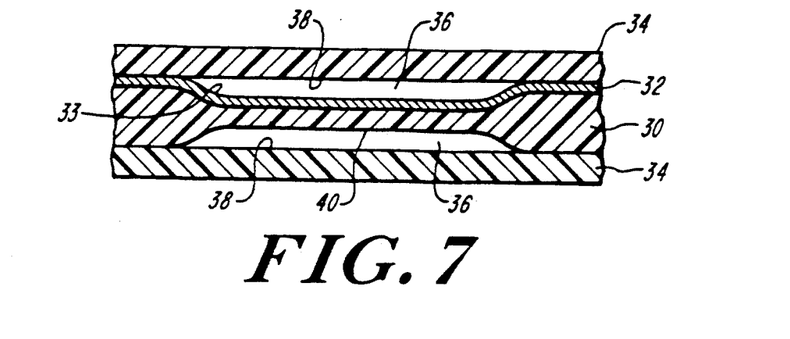
FIG. 7 shows another embodiment of the invention in which the dimensionally stable second substrate is heat sealed to both the microwave absorptive layer and first substrate.

The embodiment of FIG. 6 shows an adhesiveless susceptor film of the invention in which the dimensionally stable second substrate 34 is heat sealed to only a portion (i.e. an outer periphery) of the microwave absorptive layer 32. Thus, an air gap 36 is formed between non heat sealed surfaces 33 of the microwave absorptive layer 32 and non heat sealed surfaces 38 of the immediately adjacent second substrate 34. Similarly, FIG. 7 shows a "sandwich" configuration in which the dimensionally stable second substrate 34 is heat-sealed to an outer periphery of both the microwave absorptive layer 32 and the first substrate 30. Thus, this provides a pair of air gaps 36 between respective adjacent layers.

A further embodiment of the invention utilizes the heat sealable characteristics of the materials described herein, and the ability to selectively heat seal portions of the layers at different temperatures, pressures, dwell times, and heat-seal surface roughness characteristics to provide adhesiveless susceptor films that are selectively absorptive to microwave energy. The term "selectively absorptive", as used herein, refers to that characteristic of susceptors which allows the susceptor to absorb some portion of the microwave energy so that the susceptor will accordingly heat to different levels. As such, a susceptor of this type is well suited for applications in which it is desired to brown or to crisp different portions of a packaged food product to differing degrees. See co-pending application serial number 641,533, filed Jan. 15, 1991, "Selectively Microwave Permeable Susceptor Systems", incorporated herein by reference for a further discussion of such susceptors.

Figure 8:
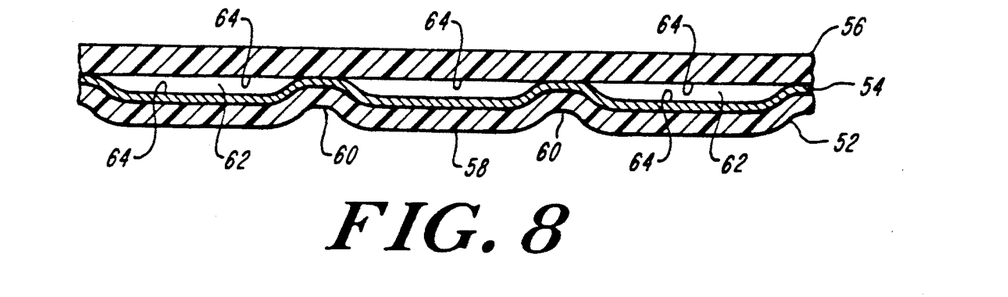
FIG. 8 shows an embodiment of FIG. 6 in which the dimensionally stable second substrate is heat sealed in a select pattern to the microwave absorptive layer.

Referring to FIG. 8, an embodiment of a selectively absorptive susceptor film 50 of the invention is shown in cross section. FIG. 8 is substantially identical to FIG. 6 but shows a plurality of partially heat-sealed portions. First substrate 52 is heat-sealable and preferably formed of an amorphous polyester, as described previously. First substrate 52 has a microwave absorptive layer 54 deposited on one of its surfaces. A dimensionally stable second substrate 56 is heat-sealed to only a portion of the microwave absorptive layer 54 in a pattern. This pattern can be a series of squares 58, the edges of which are defined by a thin membrane 60 formed by the combined heat sealing of the second substrate 56, microwave absorptive layer 54 and polyester first substrate 52. The width of the squares 58 is defined by the distance between adjacent membranes 60. Air gaps 62 are formed between non heat-sealed surfaces 64 of adjacent layers. The pattern can also include random configurations. In a preferred embodiment, the square width is between about 3 and 4 mm with membrane 60 about 1 mm wide.

Figure 9:
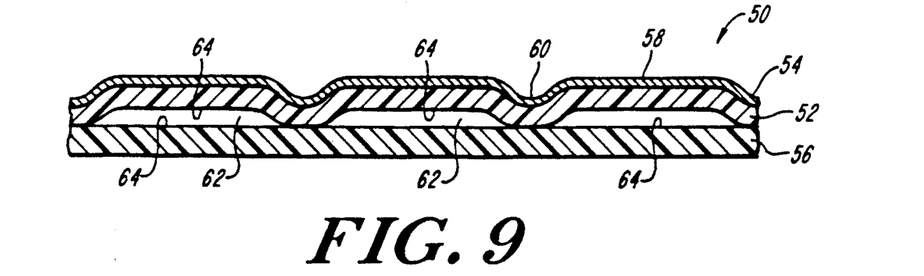
FIG. 9 shows an embodiment of FIG. 5 in which the dimensionally stable second substrate is heat sealed in a select pattern to the first substrate.

Referring to FIG. 9, substantially identical to FIG. 5 but illustrating a plurality of partially heat-sealed portions, a selectively absorptive susceptor film 50 of the invention is illustrated in which the dimensionally stable second substrate 56 is heat sealed in a patterned configuration to the polyester first substrate 52, rather than to the microwave absorptive layer 54. All reference numbers are identical to those used previously in FIG. 8. Furthermore, a "sandwich" configuration (not shown), analogous to the susceptor composite of FIG. 4, can also be formed.

It will be understood by those of ordinary skill in the art that the method of providing selective absorption to a susceptor by differentially distorting the resistance of the microwave absorptive layer using different heat-sealing pressures, temperatures and dwell-times can also be used in the susceptor composites embodied in FIGS. 2-4 in which heat sealing occurs across the entire surface of adjacent heat sealable layers and no air gaps are formed. Thus, referring to FIGS. 2-4, the dimensionally stable second substrate can be completely heat sealed to an area of the microwave absorptive layer and/or first substrate at one temperature and heat sealed at a lower temperature to an adjacent area of the microwave absorptive layer and/or first substrate. This can result in a susceptor in which adjacent areas have differing electrical resistivities but the areas are not separated by a geometric pattern.

However, if a pattern is used, by selecting the physical dimensions of the pattern (e.g. relative percentage of surface area heat-sealed versus percentage of surface area non sealed), the degree to which the microwave absorptive layer will absorb microwave energy and the amount and distribution of energy that is transmitted through the susceptor film (i.e. its degree of selective absorption) can also be varied. Therefore, by changing the patterns of the heat seals either by changing the geometric configurations and/or the distance between adjacent patterns, one can increase or decrease the heating effect of the susceptor.

In yet another embodiment of the invention, rather than providing selective microwave absorption by differentially heat sealing a susceptor composite, a dimensionally stable second substrate can be heat-sealed to the selectively absorptive susceptor described in co-pending application serial number 641,533, filed Jan. 15, 1991, previously incorporated herein by reference.

Figure 10:
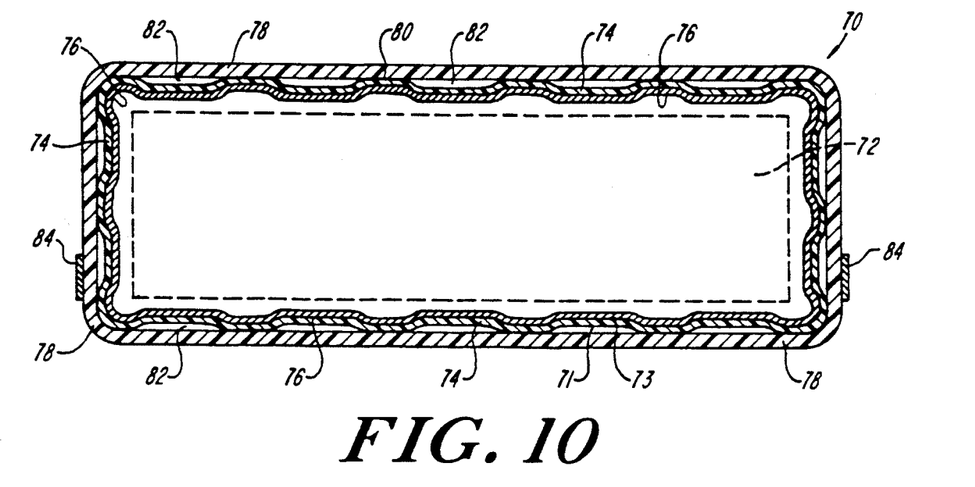
FIG. 10 shows a cross section of a microwaveable package of the present invention.

The adhesiveless susceptor film of this invention can also be incorporated into a self supporting receptacle food package for use in microwave ovens and for microwave warming of food. FIG. 10 illustrates one embodiment of a self-supporting food receptacle 70 of the invention that includes food 72 to be cooked. Although receptacle 70 is a self-supporting box, it is understood that the receptacle can be any self-supporting shape. For snack foods, a bag shape is preferred. In the embodiment illustrated in FIG. 10, the receptacle is a composite which includes a flexible first substrate 74 having opposed first and second surfaces 71, 73, onto one surface of which is deposited a microwave absorptive layer 76. This layer 76 covers a sufficient area of the first substrate 74 so that the materials comprising the composite will heat when microwaves contact the microwave absorptive layer. A dimensionally stable and microwave transparent second substrate 78 is heat-sealed to first substrate 74, on a surface opposite to the microwave absorptive layer 76. This heat-sealing is accomplished only on portions of the first substrate so that a plurality of shapes, separated from each other by a contiguous, thin membrane 80 is produced. As described previously in FIG. 9, an air gap 82 is formed between non-sealed portions of adjacent surfaces of the dimensionally stable second substrate 78 and the first substrate 74. This air gap serves to insulate the outer surface of the second substrate, which may contain lettering 84 or other symbols, from overheating as the microwave absorptive layer absorbs microwave radiation.

FIG. 10 illustrates an embodiment in which second substrate 78 is affixed to first substrate 74 and microwave absorptive layer 76 is applied on all sides of receptacle 70. Moreover, other configurations including the "sandwich" configuration of FIG. 4, or configurations completely lacking geometric patterning and/or air gaps, could also be employed in receptacles of the type illustrated in FIG. 10.

Figure 11:
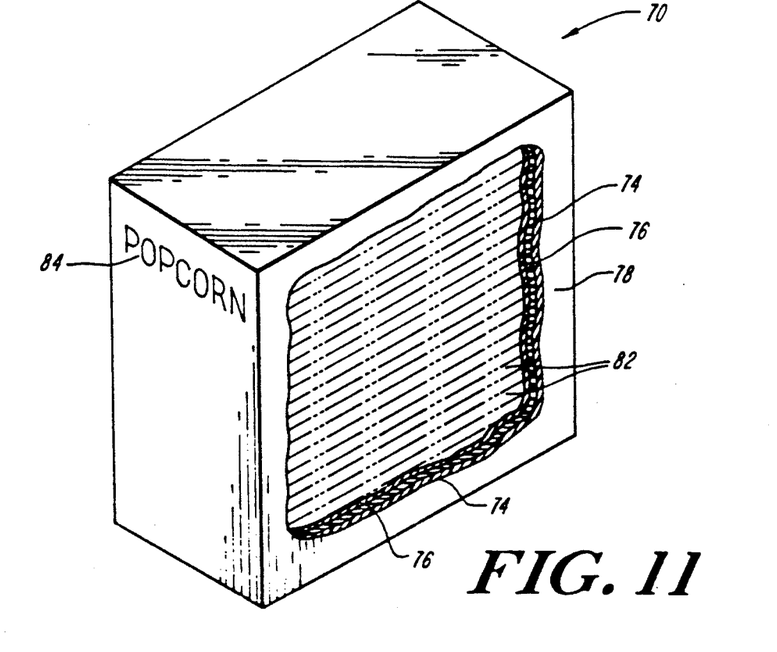
FIG. 11 shows a schematic, cut away section of a microwaveable package of the present invention.

FIG. 11 illustrates in schematic, cut-away section an embodiment of a food package substantially incorporating the adhesiveless susceptor film shown in previous FIG. 10. All referenced numbers in FIG. 11 are identical to those in FIG. 10 for use of reference. Food package 70 is a self supporting box and includes a composite comprising a flexible first substrate 74 onto one of which is deposited a microwave absorptive layer 76. The vertical dimensions of these respective layers are greatly exaggerated for ease of presentation in the figure. It will be understood that the microwave absorptive layer 76 is deposited as a thin film upon substrate 74. A dimensionally stable and microwave transparent second substrate 78 is heat-sealed to a first substrate 74 on a surface opposite to the absorptive layer 76. As illustrated in FIG. 11, this heat sealing is accomplished only on the outer periphery of the receptacle to provide a single, substantially rectangular shape in which substrate 74 is heat sealed to layer 76 only around the edges of this shape. As described previously, an air gap 82 is formed between non heat sealed portions of adjacent surfaces of the dimensionally stable second substrate 78 and the first substrate 74. As discussed above, the air gap serves to insulate the outer surface of the second substrate which make contain lettering 84 and the like. Although FIG. 11 illustrates an embodiment in which an air gap encompasses substantially the entire side of the receptacle, it will be understood that a plurality of shapes can be provided separated from each other by a plurality of air gaps, without departing from the scope of the invention.

The dimensionally stable second substrate heat-sealed to the first substrate and/or to the microwave absorptive layer comprises the entire packaging system. The second substrate does not itself become substantially heated. The package is substantially impermeable to a variety of materials and is provided with enough structural integrity to form various configurations of microwave food packaging systems.

Many other configurations of microwave barrier films for a food packaging system can be readily developed by those skilled in the art without significantly departing from the scope of this invention.

EQUIVALENTS

Although the specific features of the invention are shown in some drawings and not in others, this is for convenience only, as each feature may be combined with any or all of the other features in accordance with the invention.

It should be understood, however, that the foregoing description of the invention is intended merely to be illustrative thereof, that the illustrative embodiments are presented by way of example only, that other modifications, embodiments, and equivalents may be apparent to those skilled in the art without departing from its spirit.

Having thus described the invention, what we desire to claim and secure by Letters Patent is:

We claim:

1. A package material for use in microwave packaging and cooking of food, comprising:
   a susceptor including: a first substrate with opposed first and second surfaces, said first substrate formed of a heat-sealable material that is transparent to microwaves and that maintains its heat sealable properties at temperatures up to about 500° F.; and a microwave absorptive substrate for receiving microwave energy, the microwave absorptive material covering a sufficient area of the first substrate so that the susceptor will heat when exposed to microwaves; and
   a dimensionally stable second substrate including a heat-sealable material, the second substrate heat-sealed to at least the second surface of the first substrate.

2. The package material of claim 1, wherein the heat-sealable polymeric- material is an amorphous polyester.

3. The package material of claim 2, wherein the microwave absorptive material comprises a metal-containing material selected from the group consisting of a single metal, a metal alloy, a metal oxide, a mixture of metal oxides, a dispersion of metals, and any combination of the foregoing.

4. The package material of claim 2, wherein the second substrate is selected from the group consisting of paper, amorphous polyester-coated paper, and clay-coated paper.

5. A composite for use in a microwave oven formed into a shape sufficient to enclose a food product to be cooked, the composite comprising:
   a flexible first substrate, the first substrate comprising a heat-sealable polymeric material having opposed first and second surfaces, the material transparent to microwaves; and
   a microwave absorptive layer deposited on the first surface of the first substrate, the microwave absorptive layer covering a sufficient area of the first surface so that the composite will heat when microwaves contact the absorptive layer;
   a dimensionally stable second substrate comprising a heat-sealable material that is heat-sealed to the microwave absorptive layer.

6. The package material of claim 1, wherein said dimensionally stable second substrate is heat-sealed to a surface of the first substrate to provide a configuration in which the microwave absorptive layer and first substrate are heat-sealed between layers of dimensionally stable second substrates.

7. The composite of claim 6, wherein the heat-sealable material is an amorphous polyester.

8. The composite of claim 1, wherein said first substrate that is heat-sealed is in the form of a geometric pattern, the pattern providing selective absorption of microwave energy so that only a part of the microwave energy contacting can pass through the composite.

9. The composite of claim 7, wherein the microwave absorptive layer comprises a metal-containing material selected from the group consisting of a single metal, a metal alloy, a metal oxide, a mixture of metal oxides, a dispersion of metals, and any combination of the foregoing.

10. A package for cooking a food product in a microwave oven, comprising:
    a first substrate having opposed first and second surfaces, the first substrate comprising a heat-sealable amorphous polyester having the characteristics of Table I;
    a microwave absorptive layer affixed to a first surface of the first substrate, the microwave absorptive layer comprising a material that increases in temperature when exposed to microwave energy; and
    a dimensionally stable second substrate comprising a material that includes a heat-sealable amorphous polyester having the characteristics of a density of 1.26 (g/cc), a melt point of 265° C., elongation of 300–500% and secant modulus of 1430 Mpa, the dimensionally stable second substrate heat-sealed to at least the microwave absorptive layer.

11. An adhesiveless susceptor film comprising a plurality of layers, aid adhesiveless susceptor film comprising a first substrate layer that includes an amorphous polyester, said layer having opposed surfaces, said first substrate layer having a microwave energy-absorptive layer deposited on one of said opposed surfaces; and a dimensionally stable substrate layer containing a heat-sealable material that is heat-sealed to at least said microwave absorptive layer, wherein adjacent layers that are heat-sealed to each other are heat-sealed to each other on only a portion of their respective surface areas.

12. The adhesiveless susceptor of claim 11, wherein said first substrate layer is in the form of a geometric pattern, the pattern providing varying degrees of resistivity of said absorptive layer, so that only a part of the microwave energy can pass through the adhesiveless susceptor film.

13. The package material of claim 1, wherein said dimensionally stable second substrate is heat-sealed to a peripheral portion of said first substrate.

14. The susceptor of claim 17, wherein said adjacent layers are heat-sealed to each other at their respective peripheral surfaces.

* * * * *

UNITED STATES PATENT AND TRADEMARK OFFICE
CERTIFICATE OF CORRECTION

PATENT NO. : 5,217,768
DATED : June 8, 1993
INVENTOR(S) : Glenn J. Walters; Gordon E. Walters It is certified that error appears in the above-identified patent and that said Letters Patent is hereby corrected as shown below:

In The Claims

Claim 1, line 8, (Col. 11, line 11), after "absorptive" insert -- material deposited on the first surface of the first --.

Claim 2, line 2, (Col. 11, line 22), change "polymeric-material" to -- polymeric material --.

Claim 8, line 1, (Col. 12, line 3), change the numeral "1" to -- 5 --.

Claim 10, line 6, (Col. 12, line 19), change "Table I" to -- a density of 1.26(g/cc), a melt point of 265° C., elongation of 300-500% and secant modulus of 1430 Mpa --.

Claim 14, line 1, (Col. 12, line 51), change "susceptor of claim 17" to -- susceptor film of claim 11 --.

Signed and Sealed this

First Day of March, 1994

BRUCE LEHMAN

Attest:

Attesting Officer

Commissioner of Patents and Trademarks